(12) United States Patent
Caceres et al.

(10) Patent No.: US 10,778,444 B2
(45) Date of Patent: Sep. 15, 2020

(54) DEVICES AND METHODS FOR APPLICATION ATTESTATION

(71) Applicant: Verizon Patent and Licensing Inc., Arlington, VA (US)

(72) Inventors: Manuel Enrique Caceres, Basking Ridge, NJ (US); Bruno Mendez, Springfield, NJ (US); Mauricio Pati Caldeira De Andrada, South Plainfield, NJ (US); Warren Hojilla Uy, Randolph, NJ (US); Young R. Choi, Belle Mead, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

(21) Appl. No.: 16/032,994

(22) Filed: Jul. 11, 2018

(65) Prior Publication Data
US 2020/0021445 A1   Jan. 16, 2020

(51) Int. Cl.
*H04L 29/06*      (2006.01)
*H04L 9/32*       (2006.01)
*G06F 21/57*      (2013.01)
*H04L 9/08*       (2006.01)
*G06F 21/44*      (2013.01)

(52) U.S. Cl.
CPC ............ *H04L 9/3263* (2013.01); *G06F 21/44* (2013.01); *G06F 21/57* (2013.01); *H04L 9/0861* (2013.01); *H04L 9/3247* (2013.01); *H04L 63/20* (2013.01)

(58) Field of Classification Search
CPC ... H04L 9/3263; H04L 9/0861; H04L 9/3247; H04L 63/20; G06F 21/44; G06F 21/57
See application file for complete search history.

(56) References Cited

U.S. PATENT DOCUMENTS

| | | | |
|---|---|---|---|
| 9,141,767 | B2 * | 9/2015 | Fritsch ................. G06F 21/105 |
| 9,866,393 | B1 * | 1/2018 | Rush ..................... H04L 9/3247 |
| 10,110,385 | B1 * | 10/2018 | Rush ..................... H04L 9/3247 |
| 2012/0210441 | A1 * | 8/2012 | Hahn ...................... G06F 21/10 726/26 |
| 2015/0178721 | A1 * | 6/2015 | Pandiarajan ......... G06Q 20/382 705/75 |
| 2016/0226828 | A1 * | 8/2016 | Bone ................... H04L 63/0869 |
| 2017/0012777 | A1 * | 1/2017 | Neafsey ................ H04L 9/3213 |
| 2017/0230187 | A1 * | 8/2017 | Li .......................... H04L 9/0643 |
| 2018/0041494 | A1 * | 2/2018 | Quintero Cantero ....................... H04L 63/083 |
| 2019/0068566 | A1 * | 2/2019 | Gandhi ................. H04L 9/0894 |
| 2019/0245684 | A1 * | 8/2019 | Shen ....................... G06F 21/36 |

\* cited by examiner

*Primary Examiner* — Mahfuzur Rahman

(57) ABSTRACT

A device receives, from an application, a request to access an attestation key stored in a secure element of the device. The device obtains an attestation policy, by which to verify an identity of the application. The device examines an application file associated with the application, to determine whether the application file satisfies the attestation policy. The device selectively generates a temporary key based on a result of examining the application file. The temporary key may be used to access the attestation key. The temporary key may be generated based on the application file satisfying the attestation policy, and may not be generated based on the application file not satisfying the attestation policy.

20 Claims, 10 Drawing Sheets

DEVICES AND METHODS FOR APPLICATION ATTESTATION

BACKGROUND

Attestation is a concept by which a client device may gain the trust of a data provider, in advance of the data provider providing the client access to a server. In general, attestation refers to the provision of a signed certificate, by which the client device may submit proof that the client device, and/or the software running on the client device, is in a trusted state.

DETAILED DESCRIPTION OF PREFERRED EMBODIMENTS

Figure 1A:
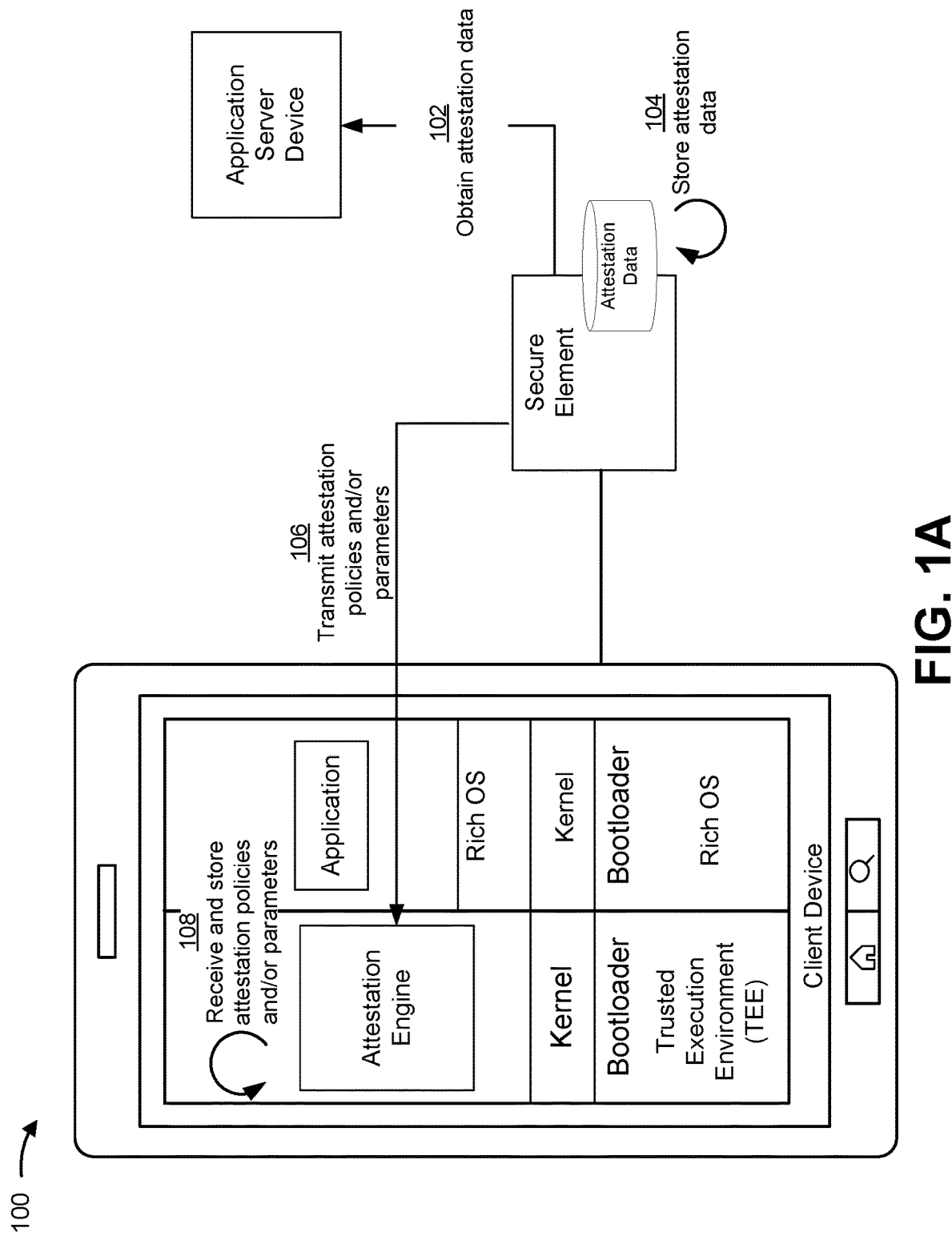
FIGS. 1A-1E are diagrams of an example implementation described herein.

The following detailed description of example implementations refers to the accompanying drawings. The same reference numbers in different drawings may identify the same or similar elements.

As the number of mobile devices, and a number of tasks being performed by mobile devices continues to proliferate, so does a number of challenges associated with ensuring that the mobile devices, and/or software used to perform the tasks, may be trusted. Namely, challenges exist in regard to protecting a service provider's (e.g., a data provider's) devices (e.g., servers, cloud-computing resources, etc.) from malicious attacks and threats posed by malware, bots, emulators, and/or the like, which are designed to mimic legitimate mobile devices and/or legitimate software (e.g., applications) running on the mobile devices.

For example, a mobile device, using a SSL/TLS handshake protocol, may send a certificate (e.g., signed by a trusted source), to a server, by which the server may attest to the identity of the mobile device, and establish trust in the mobile device. However, this type of attestation becomes ineffective where the mobile device has been rooted (e.g., jailbroken) or otherwise compromised. That is, hackers, skilled at rooting mobile devices by way of exploiting weaknesses associated with rich operating systems (e.g., Android®, iOS®), have the ability to spoof attestation of the mobile device, and conduct phishing attacks, attacks breaching confidential data, attacks breaching private data, and/or the like. Such attacks may be conducted using altered versions of a service provider's own application running on the rooted device, which can go undetected during attestation of the mobile device.

Some implementations described herein include devices and methods, by which attestation of specific applications running on a client device (e.g., a mobile device) may be performed. In some implementations, attestation data (e.g., attestation keys, attestation certificates, etc.), by which an application server device may attest to an identity of an application running on a client device, may be stored in a secure element of the client device. An attestation engine, running in a privileged, secure environment, that is independent from the rich operating system (OS), may control access to the attestation data, for example, by conditioning an application's access to the attestation data based on the application satisfying an initial attestation, to confirm that the application is running in a trusted state and/or is associated with a legitimate application identifier.

In this way, an application may be prevented from accessing the attestation data and, likewise, be prevented from accessing the application server device, until satisfying the initial attestation performed by the attestation engine. In this way, the security associated with performing client-server transactions by way of applications increases, and a service provider has further assurance that an application is legitimate and/or running in a trusted state, in advance of allowing the application access to the service provider's application server device. In this way, the application server device may attest to the identity of an application, despite a client device having been rooted or compromised. In some implementations, a multi-layered (e.g., dual) attestation may be performed by the attestation devices described herein, by which attestation of an application may be combined with attestation of the client device. In this way, the security associated with performing client-server transactions by way of the application further increases.

FIGS. 1A-1E are diagrams of an example implementation 100 described herein. As shown in FIGS. 1A-1E, implementation 100 may include a client device, an application server device, and a secure element. The client device may include an attestation engine. The secure element may be incorporated in and/or integrated with client device, in some implementations. The client device and the application server device may communicate by way of a communications network (e.g., a mobile network), as described herein.

Briefly, as shown in FIG. 1A, the client devices described herein may include multiple, separate and discrete code execution environments. One such environment includes the rich OS, from which applications stored on the client device may be executed. The rich OS includes a bootloader, used to boot the rich OS, and a kernel. The kernel acts as a bridge between the rich OS and the hardware, and connects the hardware and applications software. The rich OS may be rooted, for example, where a user removes software restrictions and is granted root (administrator) access. When a device becomes rooted, the user may install a custom (i.e., non-factory) kernel, which may compromise the client device and/or applications running on the client device. Application attestation, as described herein, may be used to verify an identity of an application and/or whether the application is in a trusted state (i.e., unaltered state), based on examining the application file, or attributes (e.g., the application code, metadata, manifest file, etc.) associated with the application file. In some implementations, an application may be attested, as described herein, regardless of whether a client device, and/or the rich OS of the client device, have been rooted. In this way, specific applications may be attested, independent from the rich OS. In this way, spoofing attestation, by way of submitting false information by way of the rich OS, may become more difficult.

Another environment disposed on the client devices described herein includes the trusted execution environment (TEE). The TEE refers to a secure area of the main processor in the client device, which ensures that sensitive data is stored, processed, and protected in an isolated, trusted environment. TEE is isolated from the rich OS, and includes a separate, isolated bootloader and kernel. In this way, the TEE is provided with a higher level of security and increased privileges compared to the rich OS. As described herein, application attestation may be perform using devices and/or information located, stored, and/or executed by the TEE. In this way, the application attestation devices and methods set forth herein may be more robust, secure, and trusted.

As shown in FIG. 1A, and by reference number 102, a secure element may obtain attestation data from an application server device. In some implementations, the secure element may include, for example, a secure chip or card of the client device, and be provisioned (e.g., over-the-air) with the attestation data, by the application server device. In some implementations, the attestation data may be pushed to the secure element, by the application server device. In some implementations, the secure element may subscribe to receive the attestation data from the application server device, retrieve the attestation data from the application server device, and/or fetch the attestation data from the application server device. In some implementations, the secure element may fetch the attestation data according to a predetermined schedule (e.g., hourly, daily, weekly, etc.), in real-time (e.g., in response to the attestation data being revised or updated by the application server device), and/or the like. The secure element may obtain attestation data from a plurality (e.g., tens, hundreds, thousands, etc.) of different application server devices, in some implementations.

In some implementations, the attestation data obtained from the application server device may include, without limitation, attestation keys or attestation certificates, by which the application server device may later attest an identity of an application. For example, the application server device may request, from an application, an attestation key corresponding to an alias key (e.g., associated with the application server device) of a key pair, or a signed attestation certificate, by way of sending a challenge to the application. The application may be denied access to the application server device, until the application can present the requested attestation key or signed attestation certificate, to the application server device. In some implementations, access to the attestation keys and/or the attestation certificates, by the application, may be conditioned or selectively controlled based on satisfying an initial attestation (e.g., a pre-attestation) of the identity of the application and/or the state of the application, by an attestation engine, as described herein. In this way, applications that have been altered, hacked, or otherwise compromised, may be prevented from accessing the attestation keys and/or the attestation certificates, and, in turn, the application server device. In this way, the secure element may function as a hardware security module (HSM), and securely store the attestation keys (e.g., symmetric keys) and/or attestation certificates, without exposing any of the private keys (e.g., asymmetric keys), which may be obtained from the application server device and held or reserved for sole use, by the secure element, to obtain future attestation data from the application server device.

In some implementations, the attestation data, obtained by the secure element, may further include any data by which an identity of an application and/or a state (e.g., a trusted state) of the application may be verified or attested, not inconsistent with the present disclosure. For example, the attestation data may include one or more attestation parameters, by which the identity of the application may be verified. Example attestation parameters include, without limitation, an electronic signature associated with an application (e.g., an APK signature, etc.), a hash associated with an application (e.g., a hash function, a numeric string (e.g., identifying an application identifier, a program manager identifier, data in the application manifest file, and/or the like) identifiable using a hash function, etc.), an algorithm associated with an application (e.g., an algorithm used to determine a hash or a plain text application identifier, program manager identifier, data in the application manifest file, etc.), a hash or algorithm for executing an executable code sent to the application, metadata associated with the application, an application identifier, an application version number, and/or the like, and/or combinations thereof.

In some implementations, the attestation data may further include one or more attestation policies, which the application engine may apply in order to attest to an application as being a legitimate (e.g., identifiable and/or associated with the application server device) application and/or existing in a trusted state, as described herein. As an example, an attestation policy may include one or more policy parameters, to be checked or verified, by the attestation engine, in order to attest that the application is legitimate and/or in existing or running in the trusted state. Example policy parameters include, without limitation, verification of data in an application file as being at rest (i.e., in storage), verification of a security level or a security control associated with the application (e.g., to verify that the application has not been altered), verification of a security level or a security control associated with the rich OS (e.g., to verify that the device has not been rooted), verification of the correct code being used to execute the application in the rich OS, and/or the like. For example, as part of an attestation policy, the attestation engine may periodically verify the integrity of the application code in RAM, by verifying the application code as being trusted, and not having been modified. The attestation policies may be used to ensure that data and/or code associated with an application file has not been modified, hacked, corrupted, or otherwise compromised by a malicious actor. In some implementations, the attestation policies may further include, as policy parameters, any of the previously described attestation parameters.

As further shown in FIG. 1A, and by reference number 104, the secure element may store the attestation data, including the attestation keys, the attestation certificates, the attestation parameters, and/or the attestation policies, as described above. The secure element may include a logically and physically tamper-resistant hardware platform, configured to securely store the attestation data. While the secure element is illustrated as being detached from the client device, the secure element may, in some cases, be secured to the client device or embedding the secure element within the client device. The secure element may include a secure chip or a microcontroller in the form of an embedded secure element, a universal integrated circuit card (UICC), an embedded universal integrated circuit card (eUICC), a secure digital (SD) card, a microSD card, a subscriber identification module (SIM) card, and/or the like. In some implementations, the secure element functions as an out-of-band authoritative entity, by which the attestation data may be securely stored, and used to prevent illegitimate applications from accessing application server devices. In this way, the secure element may serve as a trust anchor, by which application server devices may send additional attestation data for use in future attestation challenges.

As further shown in FIG. 1A, and by reference number 106, the secure element may transmit, to the attestation engine, the attestation policies and/or parameters, by which the attestation engine may perform application attestation of specific, individual applications, as described herein. In some implementations, an application may be attested, by the attestation engine and using the attestation policies and/or parameters, prior to granting the application access to the attestation keys and/or the attestation certificates in the secure element. In this way, unauthorized access to the attestation keys and/or the attestation certificates may be inhibited. As described above, the attestation engine may be stored in the TEE, and employed as a trusted source to attest to the validity of applications.

In some implementations, the attestation polices and/or parameters, when communicated from the secure element, to the attestation engine, may be communicated using an encrypted communication protocol, which ensures end-to-end encryption between the secure element and attestation engine. The communication may be encrypted according to any encryption method, not inconsistent with the present disclosure.

As further shown in FIG. 1A, and by reference number 108, the attestation engine may receive and store the attestation policies and/or parameters. Storage of the attestation policies and/or parameters by the attestation engine may be inherently secure, by virtue of the attestation engine being located or disposed in the TEE. The attestation engine may access the attestation policies and/or parameters to perform an application attestation for an application running on a client, as described herein. During application attestation, the attestation engine may attest to an application having a valid application identity and/or the attestation engine may attest to an application existing in a trusted state.

Figure 1B:
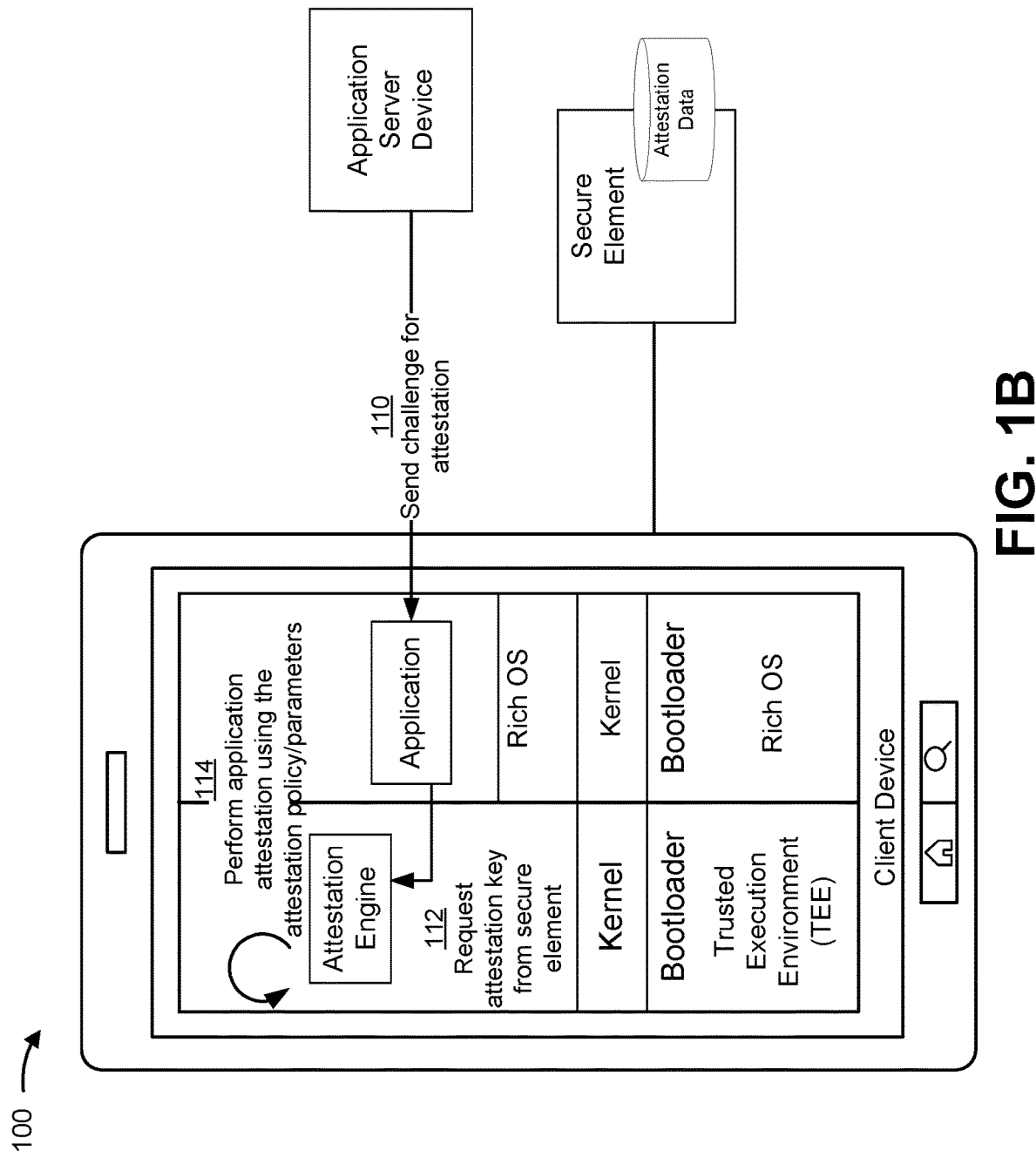

Turning now to FIG. 1B, and by reference number 110, the application server device may send, and an application may receive, a challenge. The challenge may assert the identity of the application server device, and include a request for an attestation key, or an attestation certificate signed by a trusted source (i.e., the secure element), by which the application server device may attest to the identity and/or trusted state of the application. In some implementations, the application may not be allowed access to the application server device until the application responds, to the challenge, with the correct (expected) attestation key or signed attestation certificate. The application server device may send the challenge, using SSL/TLS protocols, when the application is opened, at runtime, periodically, simultaneous with a user logging into an application, upon initiation of a new application session by the user, during periods of increased threat-levels, and/or the like. For example, the application server device may generate and send a challenge to the application based on a time-based trigger (e.g., triggering a new challenge every few minutes, hours, etc.), or a session-based trigger (e.g., each time an application session is renewed or requested). In this way, the application may be regularly attested. The application server device may challenge the application for attestation at any time, as desired, in some cases.

As further shown in FIG. 1B, and by reference number 112, the attestation engine may receive, from the application running on the client device and being challenged by the application server device (hereinafter referred to as the "challenged application"), a request to access an attestation key and/or a signed attestation certificate stored in the secure element of the client device. In some implementations, the challenged application may be configured to automatically send requests for the attestation keys and/or the attestation certificates, to the attestation engine, upon receiving a challenge from an application server device. Additionally, or, alternatively, the attestation engine may intercept requests for the attestation keys and/or the attestation certificates, prior to the requests reaching the secure element.

As further shown in FIG. 1B, and by reference number 114, the attestation engine may perform an application attestation to verify an identity of the challenged application, using the attestation policies and/or parameters, based on receiving the request to access the attestation key and/or the attestation certificate, from the challenged application. In some implementations, the attestation engine performs the application attestation by obtaining an attestation parameter stored by the attestation engine, and verifying an identity of the challenged application using the attestation parameter. In some implementations, the attestation parameter may be obtained based on performing a lookup by an application server device identifier, which corresponds to the application server device issuing the challenge (i.e., at 110, FIG. 1B).

In some implementations, the identity of the challenged application may be verified, or attested by comparing the attestation parameter obtained by the attestation engine to an application file attribute associated with the challenged application. The application file attributes may include any information associated with the challenged application and/or an application file associated with the challenged application, by which the attestation engine may verify an identity or state of the application. Example application file attributes may include, without limitation, an application hash, an application signature, application metadata, data in an application manifest file, an application version number, and/or the like. For example, where an attestation parameter includes an application signature by which to verify the identity of the application, the attestation engine may examine an application file associated with the application (e.g., the application file stored in the rich OS), and compare the application signature in the application file to the attestation parameter to verify the identity of the application. The attestation engine may attest to the identity of the challenged application in cases where the application signature in the application file matches the attestation parameter. Alternatively, the attestation engine may not attest to the identity of the challenged application where the application signature in the application file does not match the attestation parameter.

Additionally, or, alternatively, a state (e.g., trusted or not-trusted) of the challenged application may be verified, or attested, by the attestation engine. The attestation engine may attest to an application existing in a trusted state by obtaining and comparing an attestation parameter and/or an attestation policy, and an application file associated with the challenged application, to determine whether the application file satisfies the attestation policy. For example, where an attestation policy requires, specifies, or instructs the attestation engine to verify whether an application file includes data at rest (e.g., the code is benign), the attestation engine may examine the application file in storage (e.g., RAM) to verify whether it satisfies the condition (e.g., policy parameter) of including data at rest. Where the application, by way of the application file, satisfies the attestation policy, the attestation engine may attest to the application being in a trusted state. As another example, where an attestation policy requests verification of a security level or a security control associated with the application, the attestation engine may examine the application file to verify whether the application file includes the security level or security control (e.g., specific software restrictions, secure levels of encryption, etc.). Where an examination of data in the application file, by the attestation engine, satisfies the attestation policy, the attestation engine may attest to the application as being in the trusted state. Alternatively, where the examination of data in the application file, by the attestation engine, does not satisfy the attestation policy, the attestation engine may not attest to the application as being in the trusted state.

Figure 1C:
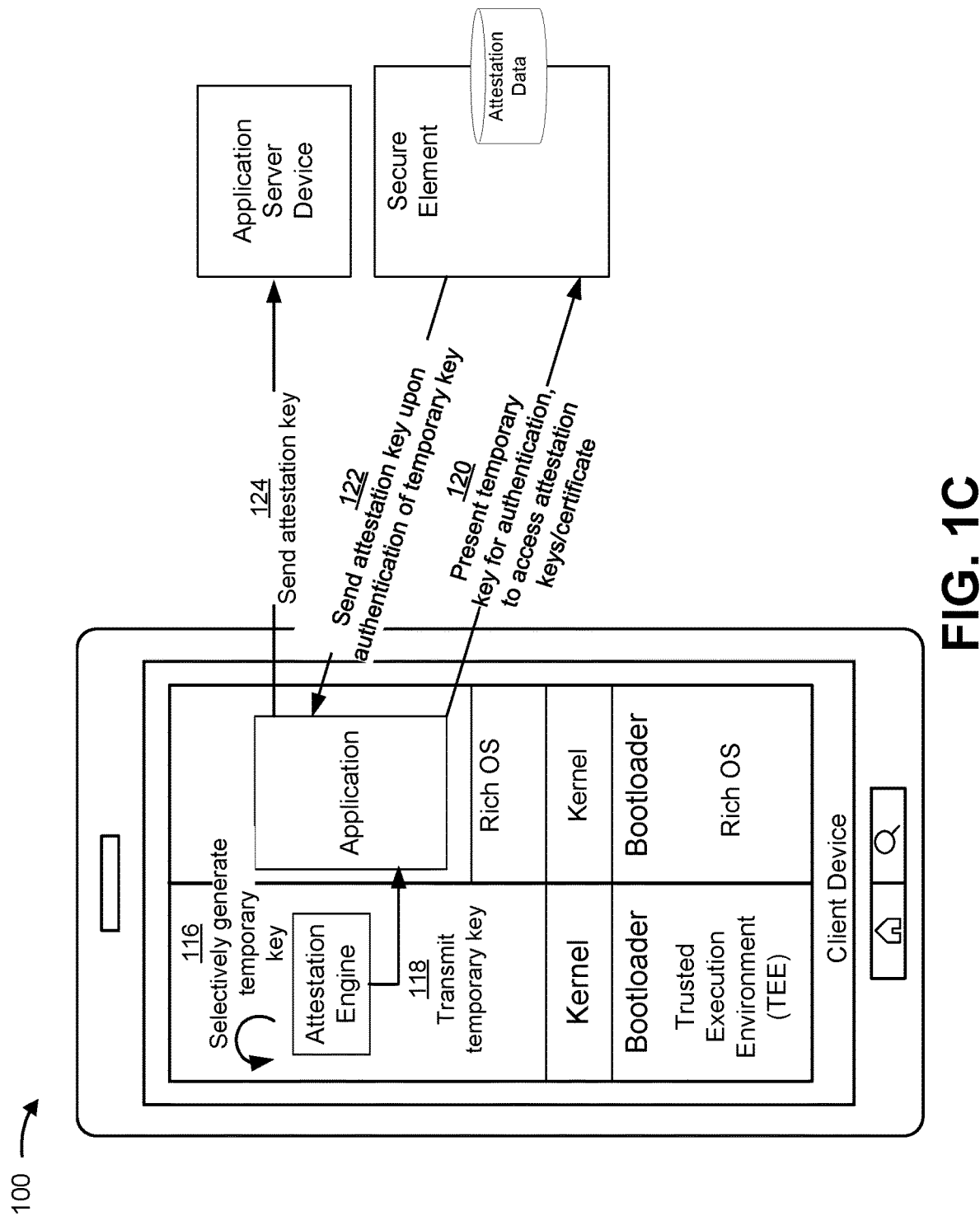

Turning now to FIG. 1C, and by reference number 116, the attestation engine may selectively generate a temporary key based on a result of comparing the attestation parameter and the application file attribute. Additionally, or alternatively, the attestation engine may selectively generate a temporary key based on a result of whether an examination of the application and/or the application file satisfies the attestation policy, as described above. Where, for example, the attestation parameter includes an application signature, and the application file attribute includes a signature that matches the attestation parameter, the attestation engine may generate the temporary key. Alternatively, where the application file attribute does not match the attestation parameter, the attestation engine may not generate the temporary key. As another example, where, for example, the attestation parameter includes an application hash, and the application file attribute includes a hash that matches the attestation parameter, the attestation engine may generate the temporary key. Alternatively, where the application hash does not match the attestation parameter, the attestation engine may not generate the temporary key.

As a further example, and, as part of an attestation policy, the attestation engine may periodically verify the integrity of the application code in RAM, by verifying the application code as not having been modified. The attestation engine may determine that the application code has not been modified based on a software version of the code, timestamp data associated with the code, and/or by comparing the code to code received from the application server device. Where the attestation engine determines that the application code in RAM has not been modified, the attestation engine may generate the temporary key. Alternatively, where the attestation engine determines that the application code in RAM has been modified, the attestation engine may not generate the key. In this way, access to the attestation keys and/or attestation certificates in the secure element by way of the temporary key may be conditioned on the application satisfying the attestation parameter and/or policies. In this way, applications that fail to satisfy the attestation policies and/or parameters may not be given a temporary key by which to access to the attestation keys and/or the attestation certificates in the secure element.

As further shown in FIG. 1C, and by reference number 118, where the attestation engine generates a temporary key (e.g., based on satisfaction of the attestation policies and/or parameters), the attestation engine may transmit the temporary key to the application. The temporary key may cause an action to be performed upon receipt of the temporary key, as described herein. In some implementations, the temporary key includes a symmetric key of a key pair, which may be generated according to a symmetric-key algorithm. In some implementations, the temporary key may not be stored by the attestation engine. Alternatively, the temporary key may be temporarily stored by the attestation engine, and deleted (erased, discarded, etc.) after a predetermined period of time (e.g., seconds, minutes, hours, etc.). In some implementations, the temporary key may be regenerated for each application session, based on performing a subsequent application attestation, to ensure that the legitimacy of the application may be prolonged or maintained. In some implementations, the temporary key may include a reusable key associated with a set of keys, in which the temporary key may be generated or selected based on being a next key, according to ascending or descending order, in the set of temporary keys.

As further shown in FIG. 1C, and by reference number 120, the application may receive the temporary key, and present the temporary key to the secure element, to gain access to the attestation keys and/or attestation certificates. The temporary key may be sent to the secure element by way of a secure, encrypted communication. In some implementations, an action may be performed based on receipt of the temporary key, by the secure element. For example, the action may include denying the application access to the attestation key, or granting the application access to the attestation key, based on the secure element authenticating the temporary key. In this way, the secure element may condition access to the attestation keys and/or the attestation certificates upon authentication of the temporary key. As an example, the secure element may authenticate the temporary key by comparing the key to an alias key held by the secure element. The temporary key may be authenticated in instances where the temporary key corresponds to the alias key, and not authenticated in instances where the temporary key fails to correspond to the alias key.

As further shown in FIG. 1C, and by reference number 122, the secure element may send, to the application, the attestation key upon authentication of the temporary key. Alternatively, in some implementations, the secure element may sign an attestation certificate, as a trusted source, and send the application the signed certificate. In some implementations, the secure element may send the attestation key and/or the attestation certificate by way of a secure, encrypted communication. In this way, end-to-end encryption for communications between the application and the secure element may be provided, which increases the security associated with attestation.

As further shown in FIG. 1C, and by reference number 124, the application may respond to the challenge (i.e., 110, FIG. 1B), from the application server device, by sending the attestation key. Alternatively, the application may respond to the challenge by presenting a signed attestation certificate to the application server device. The application server device may grant the application access to the application server device, based on attesting the application using the attestation key and/or attestation certificate. Where the attestation key and/or attestation certificate satisfy the challenge, the application server device may grant the application access to data or content on the application server device. Where the attestation key and/or the attestation certificate fail to satisfy the challenge, the application server device may deny the application access to data or content on the application server device. In this way, the application may be attested by an attestation engine, in addition to the application server device, which provides a more secure, multi-layered approach to application attestation.

In some implementations, the application attestation described herein may be used alone, or in combination with attestation of the client device. In this way, the client device-server transactions performed using an application may be further increased. In this regard, in some implementations, the application server device may challenge the client device for a client device attestation key and/or a signed, client device certificate. The secure element may store client device attestation keys and/or the client device certificates, in addition to the application attestation keys, and respond to the challenge with the attestation key, and, at least one of a client device key, or the signed client device certificate.

Figure 1D:
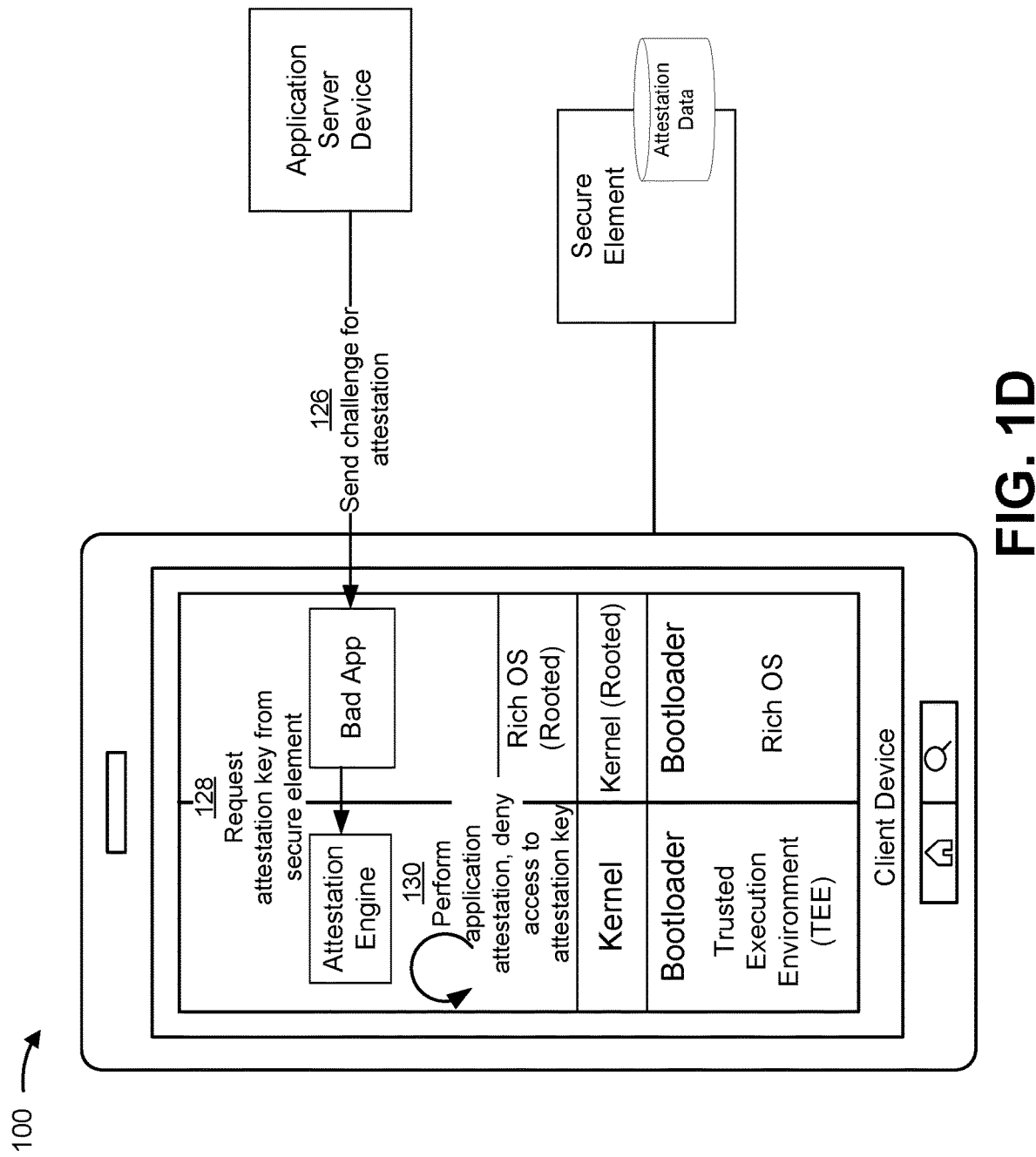

Turning now to FIG. 1D, and by reference number 126, an application server device may send a challenge to an application for attestation. In the example shown in FIG. 1D, assume that the rich OS and kernel of the rich OS of the client device have been rooted. As further shown in this implementation, the client device may include a bad application, which may include an altered, compromised, hacked, or otherwise illegitimate application.

As further shown in FIG. 1D, and by reference number 128, the bad application may send a request to the attestation engine for an attestation key (or, alternatively an application certificate). In some implementations, the request is sent upon being challenged by the application server device.

As further shown in FIG. 1D, and by reference number 130, the attestation engine may perform an application attestation, and deny the bad application access to the attestation key. The bad application may be denied access based on the attestation engine failing to attest to legitimacy and/or trusted state of the application. For example, the bad application may include application file attributes (e.g., hashes, signatures, metadata, etc.) that fail to correspond or match an attestation parameter. As another example, the bad application may not include data at rest, or may include data that has been altered in RAM. Where the attestation engine fails to attest to an identity and/or trusted state of an application, as in this case, the application may be denied access to attestation data stored by the secure element. Where the attestation engine fails to attest to an identity and/or trusted state of the application, the attestation engine may not generate the temporary key, by which an application may access the attestation data in the secure element. In this way, the bad application is prevented from accessing the attestation data and, likewise, precluded from accessing the application server device. Upon being denied access to the attestation data, a user of the client device may be notified (e.g., visually, audibly, etc.) that access to the application server device has been denied. One or more corrective actions may also be taken, where desired, upon access to the application server device being denied.

Figure 1E:
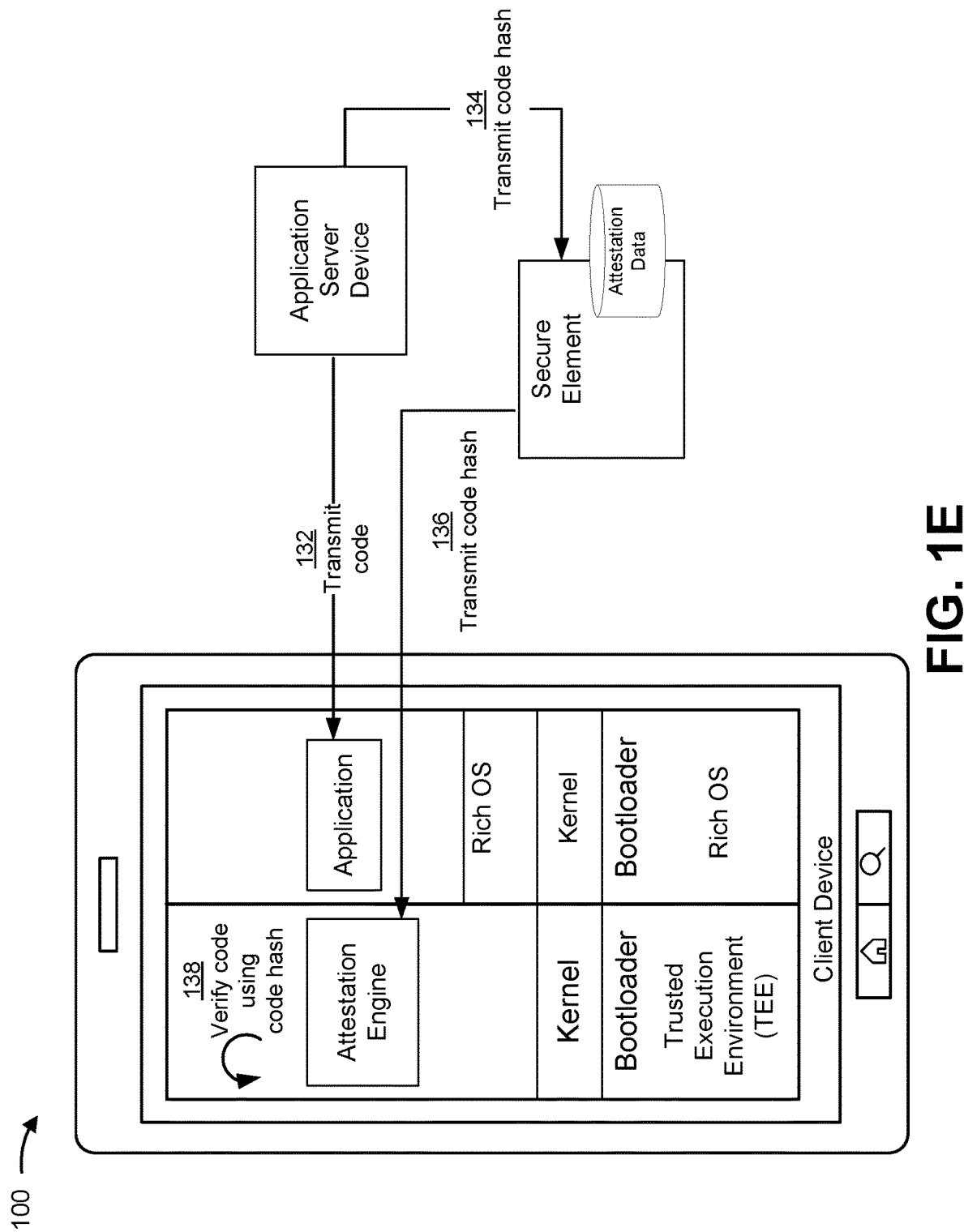

Turning now to FIG. 1E, and by reference number 132, in some implementations, the application server device may transmit code (e.g., executable code, machine language, byte code, binary code, etc.) to the application for attestation by the attestation engine. This may be useful, for example, in instances where the code is to be used for sensitive business purposes or contains sensitive logic. The code may be transmitted by way of an encrypted communication, to inhibit the code from being accessed by unauthorized entities. In some implementations, the code may be transmitted dynamically (e.g., simultaneously with the application runtime on the client device, based on detecting that the application has been launched, and/or the like).

As further shown in FIG. 1E, and by reference number 134, the application server device may transmit a hash (e.g., key, algorithm, hash function, etc.) for attesting the code, to the secure element. The hash for attesting the code may be securely stored in the secure element.

As further shown in FIG. 1E, and by reference number 136, the hash for attesting the code may be transmitted, to the attestation engine, for use in attesting the code. The code may be transmitted or sent using an encrypted communication protocol for increased security.

As further shown in FIG. 1E, and by reference number 138, the attestation engine may verify, or attest, the legitimacy of the code using the hash received from the secure element. For example, the attestation engine may obtain the code from the application, obtain the hash from the secure element, and verify that the code received from the application is legitimate, unaltered code based on the hash. As an example, the hash may include an algorithm or function used to decrypt the code received from the application, to verify that the code is legitimate code intended for use the application, from the application server device. In some implementations, and, upon verification of the code, the attestation engine may load the code into RAM for use by the application. In this way, the application server device may be assured that the application attempting the gain access to the application server device is running legitimate, unaltered code.

The application attestation devices and methods set forth herein may selectively condition access to attestation keys stored in a secure element based on verification of the satisfaction of attestation parameters and/or policies by an attestation engine. In this way, illegitimate and altered applications may be prevented from accessing the attestation data and, likewise, be prevented from accessing the application server device, until satisfying the initial attestation performed by the attestation engine. The attestation engine may be stored in the TEE, independent from the rich-OS. In this way, the application may be attested independent from the rich OS, which may inhibit attestation spoofing. In this way, the security associated with performing client device-server transactions by way of an application increases, and a service provider has further assurance that an application is legitimate and/or running in a trusted state, in advance of allowing the application access to the service provider's application server device. In this way, the application server device may attest to the identity of an application, despite a client device having been rooted or compromised.

As indicated above, FIGS. 1A-1E are provided merely as an example. Other embodiments are possible, and may differ from what was described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIG. 1A-1E may be implemented within a single device, or a single device shown in FIG. 1A-1E may be implemented as multiple, distributed devices. Additionally, or alternatively, a set of devices (e.g., one or more devices) of implementation 100 may perform one or more functions described as being performed by another set of devices of implementation 100.

Figure 2:
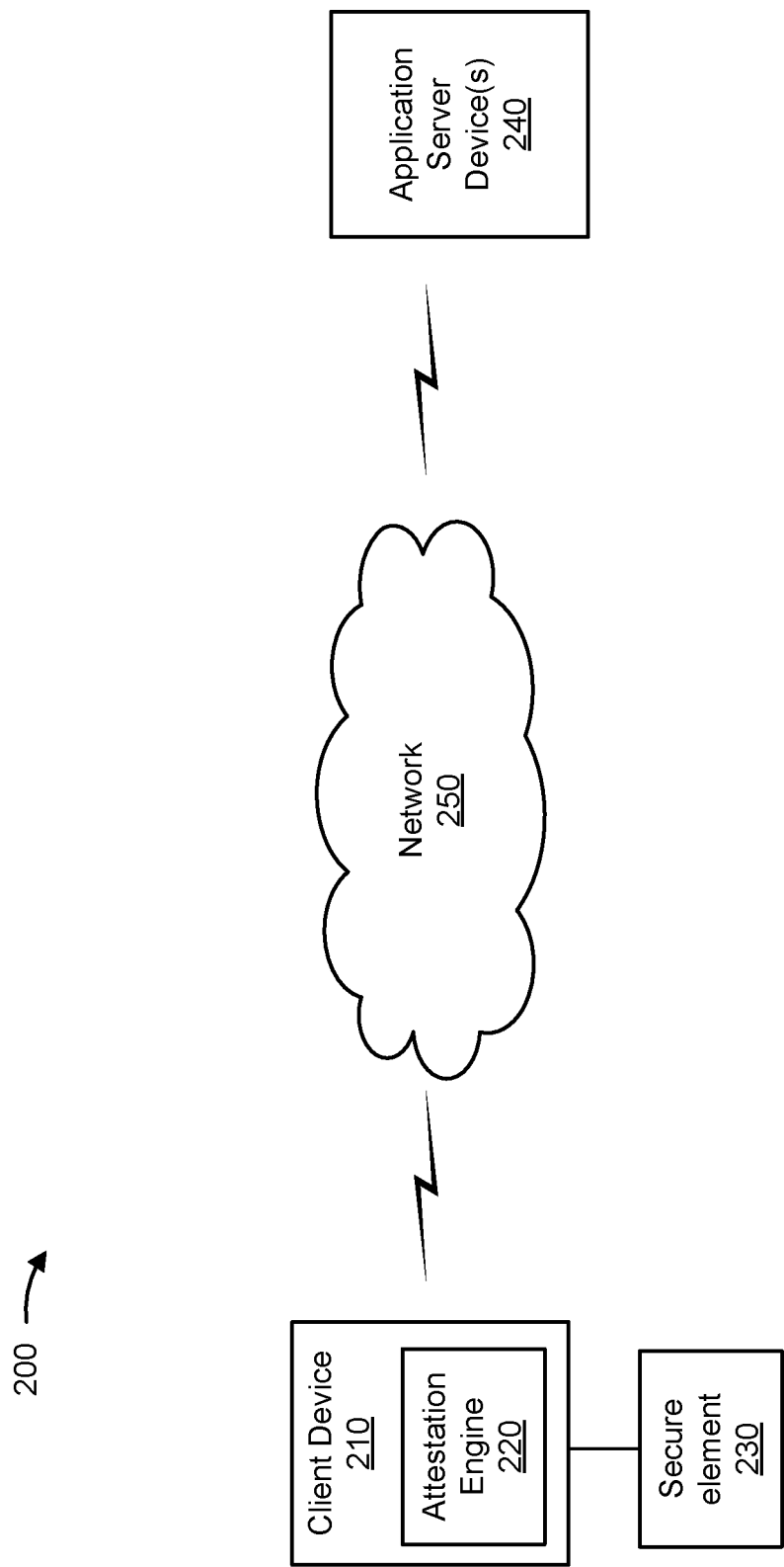
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an attestation engine 220, a secure element 230, an application server device 240, and a network 250. Devices of environment 200 may interconnect via wired connections, wireless connections, or a combination of wired and wireless connections.

Client device 210 includes one or more devices capable of sending, receiving, generating, storing, processing, and/or providing information associated with performing application attestation. For example, client device 210 may include a communication and/or computing device, such as a mobile device (e.g., a smart device), a mobile phone (e.g., a smart phone), a laptop computer, a tablet computer, a handheld computer, a gaming device, a wearable communication device (e.g., a smart wristwatch, a pair of smart eyeglasses, etc.), and/or a similar type of device. Client device 210 may include one or more interfaces, applications, or services, by which client device 210 may communicate with application server device 240 and/or network 250 for performing one or more aspects of application attestation and/or client device 210 attestation, as described herein.

Attestation engine 220 may be provided within a computer-readable medium of client device 210, for performing application attestation, as described herein. Attestation engine 220 may be located in the TEE of client device 210, and perform application attestation tasks to verify the identity of an application, which may include, for example, tools, logic, source code, hashes, algorithms, and/or the like, executed by a hardware processor.

Secure element 230 includes one or more devices capable of securely storing information, such as the attestation data (e.g., attestation parameters, attestation policies, attestation keys, attestation certificates, and/or the like), cryptographic information, and/or the like, as described herein, for use in performing application attestation. For example, secure element 230 may include a secure chip or a microcontroller in a form of an embedded secure element, a UICC, an eUICC, a secure digital (SD) card, a microSD card, a SIM card, and/or the like. Secure element 230 may be physically secure (e.g., tamper-resistant, tamper proof, etc.), logically secure, and/or the like. Secure element 230 may include military-grade materials and/or shielding. Secure element 230 may be local to client device 210, removable relative to client device 210, and/or non-removable relative to client device 210. Secure element 230 may include a tamper resistant hardware platform, including one or more processors, for securely storing information.

Application server device 240 includes one or more devices capable of sending, receiving, generating, storing, processing, and/or providing information associated with performing application attestation. For example, application server device 240 may include a server device, a cloud computing resource, a data center device, and/or a similar type of device. Application server device 240 may communicate attestation data and/or policies to secure element 230 of client device 210 for use in performing attestation, as described herein, by which the identities of applications running on client device 210, and/or client device 210, may be verified.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
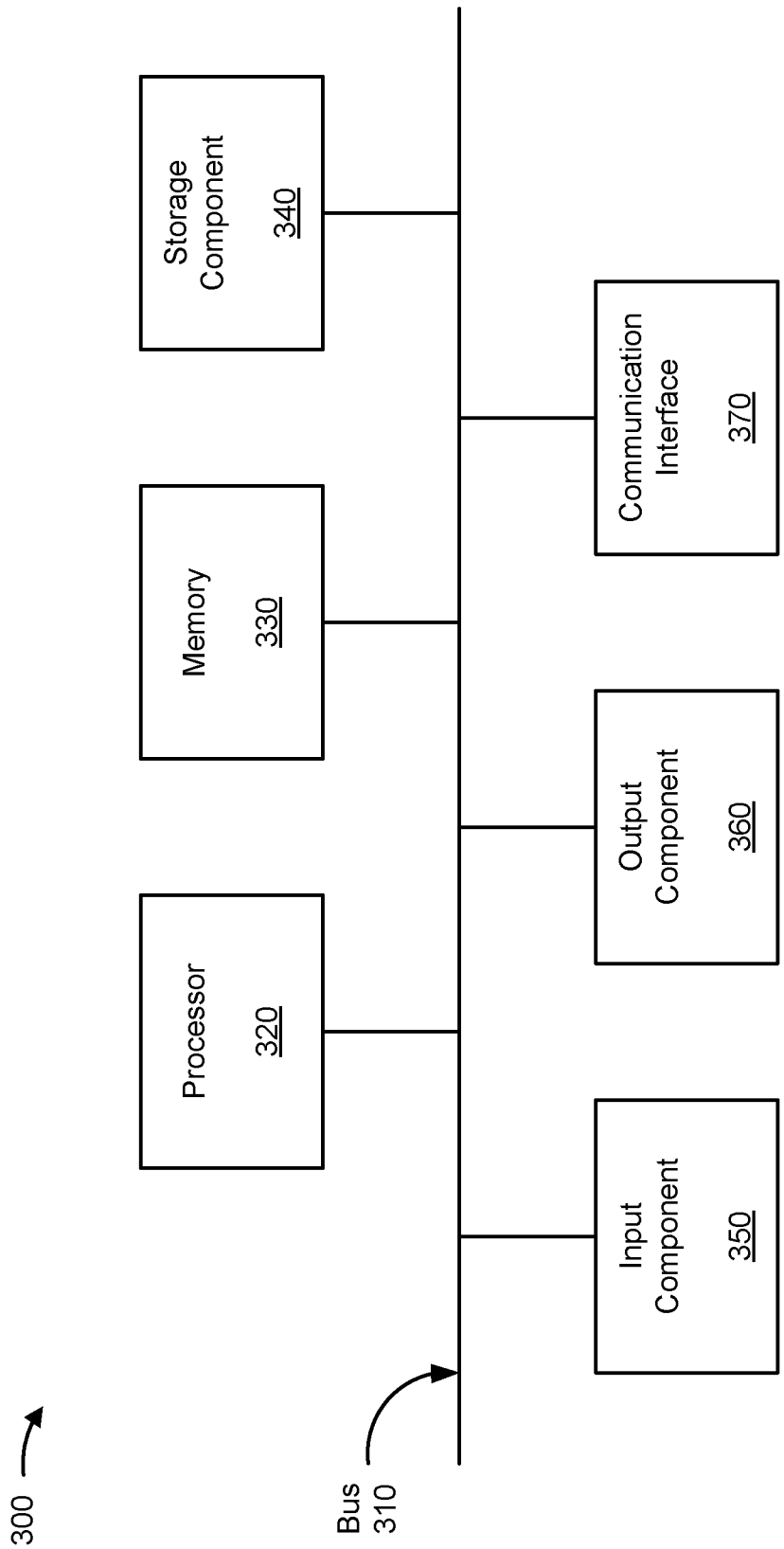
FIG. 3 is a diagram of example components of one or more devices of FIG. 2.

FIG. 3 is a diagram of example components of a device 300. Device 300 may correspond to client device 210, attestation engine 220, secure element 230, and/or application server device 240. In some implementations, client device 210, attestation engine 220, secure element 230, and/or application server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
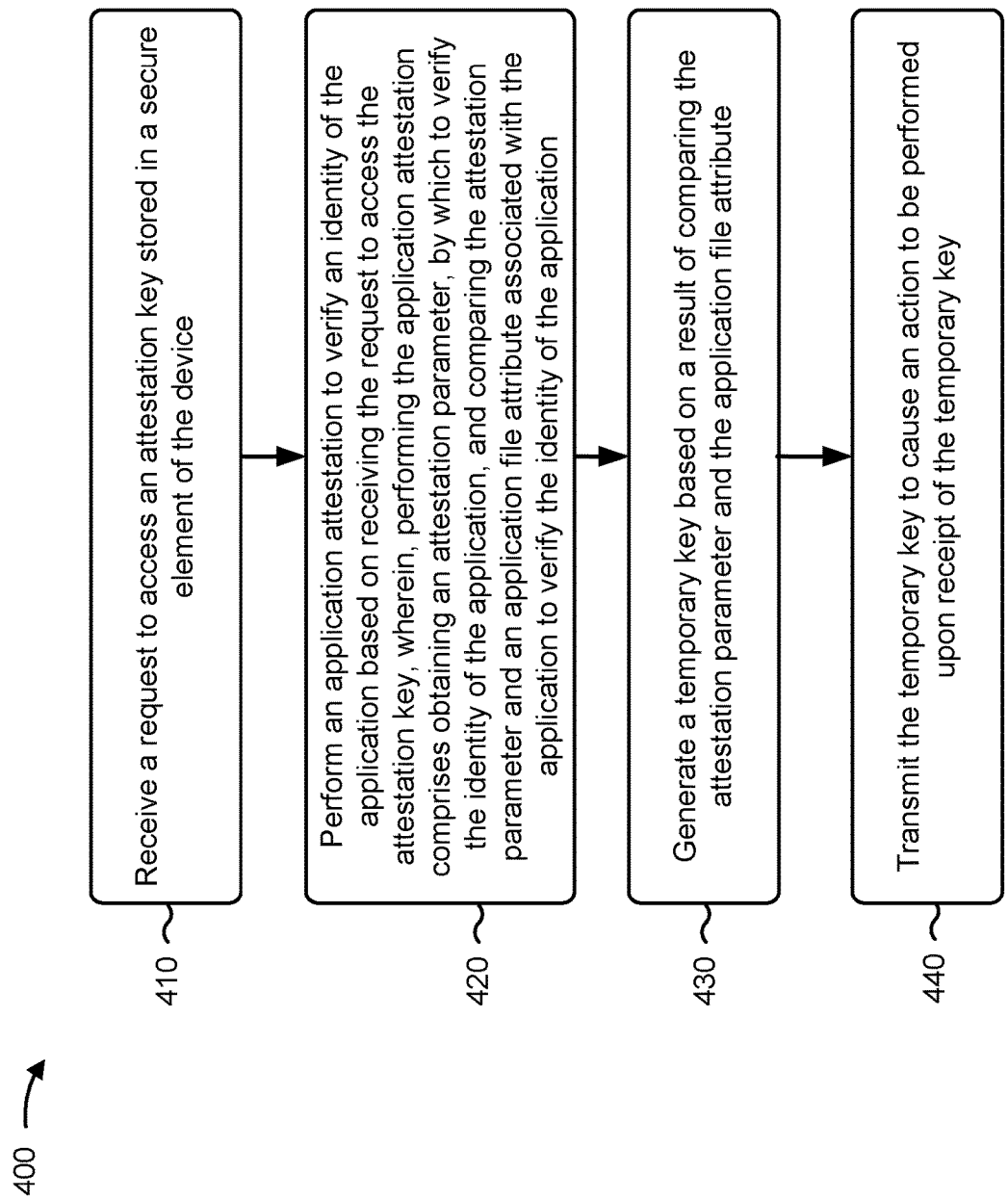
FIG. 4 is a flow chart of an example process for performing application attestation.

FIG. 4 is a flow chart of an example process 400 for performing application attestation. In some implementations, one or more process blocks of FIG. 4 may be performed by an attestation engine (e.g., attestation engine 220). In some implementations, one or more process blocks of FIG. 4 may be performed by another device or a group of devices separate from or including attestation engine (e.g., attestation engine 220), such as a client device (e.g., client device 210), a secure element (e.g., secure element 230), and an application server device (e.g., application server device(s) 240).

As shown in FIG. 4, process 400 may include receiving a request to access an attestation key stored in a secure element of the device (block 410). In some implementations, an attestation engine (e.g., attestation engine 220, using processor 320, memory 330, storage component 340, input component 350, communication interface 370, and/or the like), may receive a request to access an attestation key stored in a secure element of the device, as described above in connection with FIGS. 1A-1E.

As further shown in FIG. 4, process 400 may include performing an application attestation to verify an identity of the application based on receiving the request to access the attestation key (block 420). In some implementations, an attestation engine (e.g., attestation engine 220, using processor 320, memory 330, storage component 340, input component 350, output component 360, communication interface 370, and/or the like) may perform an application attestation to verify an identity of the application based on receiving the request to access the attestation key, as described above in connection with FIGS. 1A-1E. In some implementations, performing the application attestation may include obtaining an attestation parameter, by which to verify the identity of the application, and comparing the attestation parameter and an application file attribute associated with the application to verify the identity of the application.

As further shown in FIG. 4, process 400 may include generating a temporary key based on a result of comparing the attestation parameter and the application file attribute (block 430). In some implementations, an attestation engine (e.g., attestation engine 220, using processor 320, memory 330, storage component 340, communication interface 370, and/or the like) may generate a temporary key based on a result of comparing the attestation parameter and the application file attribute, as described above in connection with FIGS. 1A-1E.

As further shown in FIG. 4, process 400 may include transmitting the temporary key to cause an action to be performed upon receipt of the temporary key (block 440). In some implementations, an attestation engine (e.g., attestation engine 220, using processor 320, memory 330, storage component 340, communication interface 370, and/or the like) may transmit the temporary key to cause an action to be performed, by the application, upon receipt of the temporary key, as described above in connection with FIGS. 1A-1E.

Process 400 may include additional implementations, such as any single implementation or any combination of implementations described below and/or described with regard to any other process described herein.

In some implementations, process 400 may attest an application running on a mobile device. In some implementations, process 400 may be performed using one or more devices located or disposed in the TEE. In some implementations, the secure element of the device comprises a UICC, an eUICC, a SIM card, and/or the like.

In some implementations, process 400 may include, as attestation parameters, an electronic signature, a hash value, an algorithm for executing an executable code, or metadata. In some implementations, process 400 may include selectively generating the temporary key. In some implementations, the temporary key may include a symmetric key, by which access to the attestation key may be selectively provided. In some implementations, process 400 may include, as actions based on receiving the temporary key, granting the application access to the attestation key upon presentation of the temporary key, or denying the application access to the attestation key upon presanction of the temporary key. In some implementations, process 400 may include discarding the temporary key upon transmitting the temporary key to the application. The actions described herein may be performed by the device, or a component thereof, such as the attestation engine, the application, the secure element, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
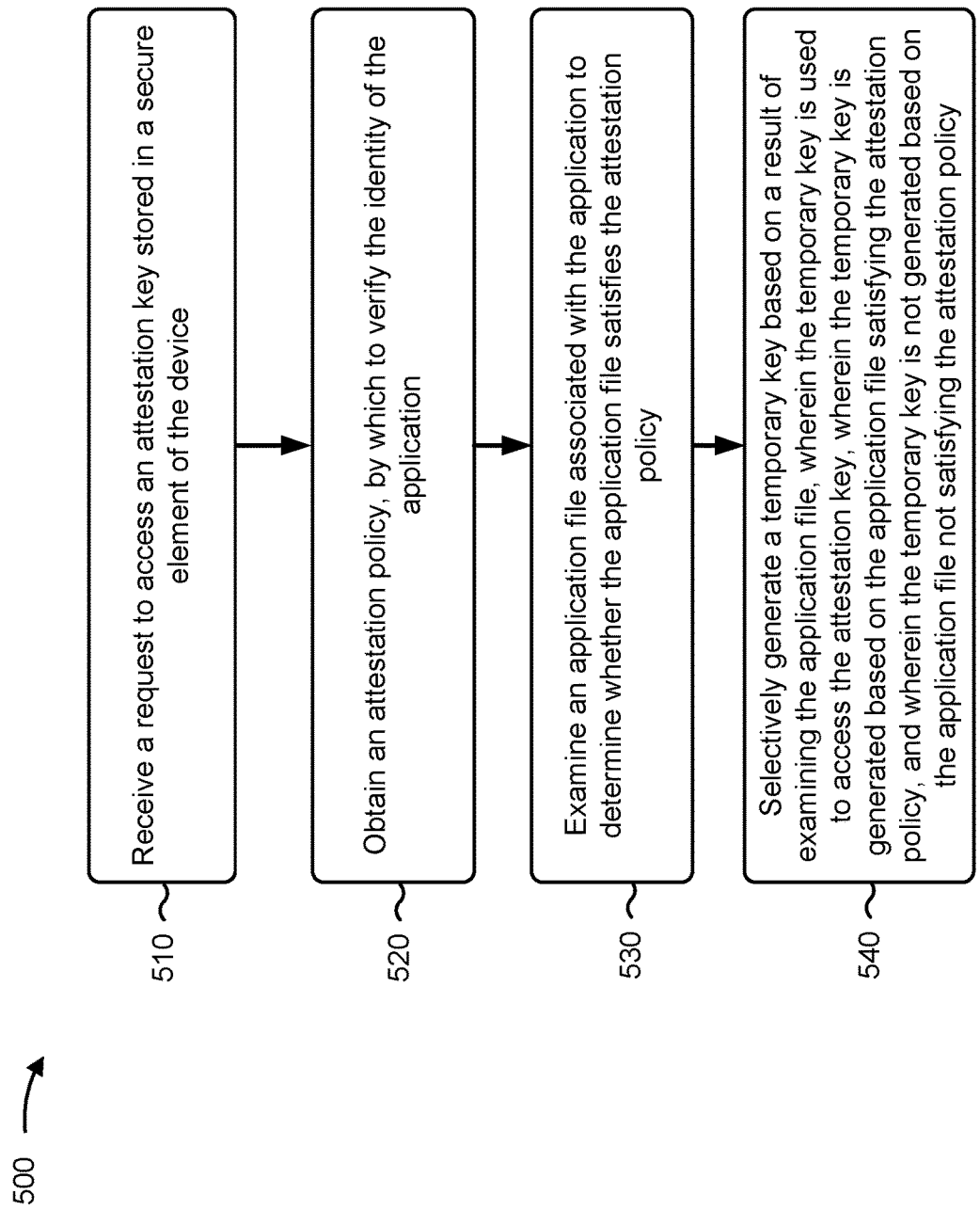
FIG. 5 is a flow chart of an example process for performing application attestation.

FIG. 5 is a flow chart of an example process 500 for performing application attestation. In some implementations, one or more process blocks of FIG. 5 may be performed by an attestation engine (e.g., attestation engine 220). In some implementations, one or more process blocks of FIG. 5 may be performed by another device or a group of devices separate from or including attestation engine (e.g., attestation engine 220), such as a client device (e.g., client device 210), a secure element (e.g., secure element 230), and an application server device (e.g., application server device(s) 240).

As shown in FIG. 5, process 500 may include receiving a request to access an attestation key stored in a secure element of the device (block 510). In some implementations, an attestation engine (e.g., attestation engine 220, using processor 320, memory 330, storage component 340, input component 350, communication interface 370, and/or the like) may receive a request to access an attestation key stored in a secure element of the device, as described above in connection with FIGS. 1A-1E.

As further shown in FIG. 5, process 500 may include obtaining an attestation policy, by which to verify the identity of the application (block 520). In some implementations, an attestation engine (e.g., attestation engine 220, using processor 320, memory 330, storage component 340, input component 350, output component 360, communication interface 370, and/or the like) may obtain an attestation policy, by which to verify the identity of the application, as described above in connection with FIGS. 1A-1E.

As further shown in FIG. 5, process 500 may include examining an application file associated with the application to determine whether the application file satisfies the attestation policy (block 530). In some implementations, an attestation engine (e.g., attestation engine 220, using processor 320, memory 330, storage component 340, communication interface 370, and/or the like) may examine an application file associated with the application to determine whether the application file satisfies the attestation policy, as described above in connection with FIGS. 1A-1E.

As further shown in FIG. 5, process 500 may include selectively generating a temporary key based on a result of examining the application file (block 540). In some implementations, an attestation engine (e.g., attestation engine 220, using processor 320, memory 330, storage component 340, communication interface 370, and/or the like) may selectively generate a temporary key based on a result of examining the application file, as described above in connection with FIGS. 1A-1E. In some implementations, the temporary key is used to access the attestation key. In some implementations, the temporary key is generated based on the application file satisfying the attestation policy. In some implementations, the temporary key is not generated based on the application file not satisfying the attestation policy.

Process 500 may include additional implementations, such as any single implementation or any combination of implementations described below and/or described with regard to any other process described herein.

In some implementations, process 500 may include generating the temporary key, and transmitting, to the application, the temporary key to cause an action to be performed upon receipt of the temporary key. In some implementations, the action includes granting the application access to the attestation key, based on receiving the temporary key. In some implementations, the action includes denying the application access to the attestation key.

In some implementations, process 500 may include receiving, from the application, a subsequent request to access the attestation key stored in the secure element of the device, performing a subsequent application attestation to verify the identity of the application based on receiving the subsequent request, generating a new temporary key based on a result of performing the subsequent application attestation, and transmitting, to the application, the new temporary key to cause a subsequent action to be performed based upon receipt of the new temporary key.

In some implementations, process 500 may include receiving, from an application server device, a request to verify an executable code, obtaining, from the application, the executable code based on receiving the request, obtaining, from the secure element, an algorithm for executing the executable code, executing the executable code using the algorithm, and sending, to the application, the executable code for verification by the application server device.

In some implementations, process 500 may include receiving, from an application server device, a request for a device certificate by which to verify an identity of the device, and transmitting, to the application server device, the device certificate for verifying the identity of the device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
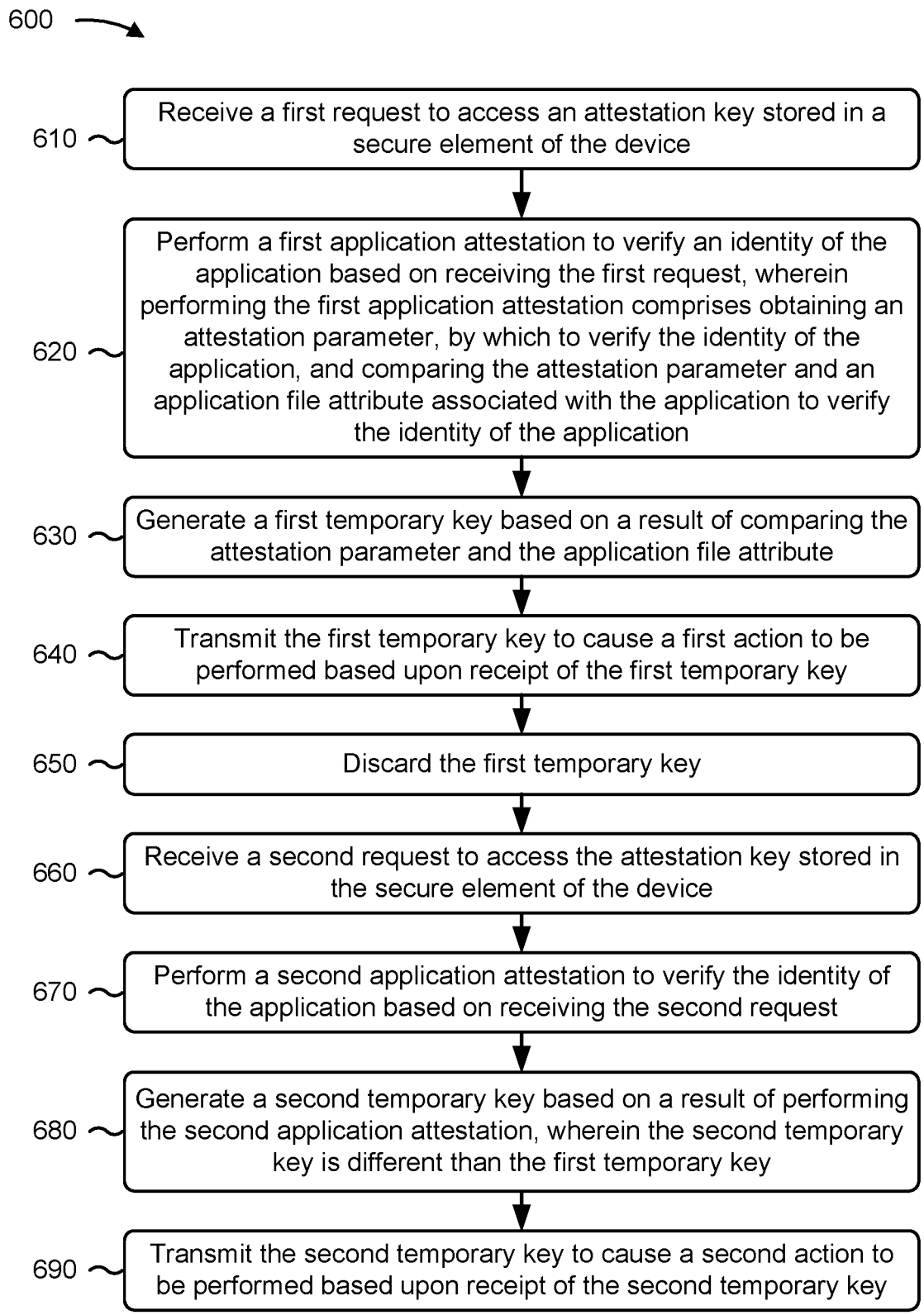
FIG. 6 is a flow chart of an example process for performing application attestation.

FIG. 6 is a flow chart of an example process 600 for performing application attestation. In some implementations, one or more process blocks of FIG. 6 may be performed by an attestation engine (e.g., attestation engine 220). In some implementations, one or more process blocks of FIG. 6 may be performed by another device or a group of devices separate from or including attestation engine (e.g., attestation engine 220), such as a client device (e.g., client device 210), a secure element (e.g., secure element 230), and an application server device (e.g., application server device(s) 240).

As shown in FIG. 6, process 600 may include receiving a request to access an attestation key stored in a secure element of the device (block 610). In some implementations, an attestation engine (e.g., attestation engine 220, using processor 320, memory 330, storage component 340, input component 350, communication interface 370, and/or the like) may receive a request to access an attestation key stored in a secure element of the device, as described above in connection with FIGS. 1A-1E.

As further shown in FIG. 6, process 600 may include performing an application attestation to verify an identity of the application based on receiving the first request (block 620). In some implementations, an attestation engine (e.g., attestation engine 220, using processor 320, memory 330, storage component 340, communication interface 370, and/or the like) may perform an application attestation to verify an identity of the application based on receiving the first request, as described above in connection with FIGS. 1A-1E. In some implementations, performing the application attestation includes obtaining an attestation parameter, by which to verify the identity of the application, and comparing the attestation parameter and an application file attribute associated with the application to verify the identity of the application.

As further shown in FIG. 6, process 600 may include generating a first temporary key based on a result of comparing the attestation parameter and the application file attribute (block 630). In some implementations, an attestation engine (e.g., attestation engine 220, using processor 320, memory 330, storage component 340, communication interface 370, and/or the like) may generate a first temporary key based on a result of comparing the attestation parameter and the application file attribute, as described above in connection with FIGS. 1A-1E.

As further shown in FIG. 6, process 600 may include transmitting the first temporary key to cause a first action to be performed based upon receipt of the first temporary key (block 640). In some implementations, an attestation engine (e.g., attestation engine 220, using processor 320, memory 330, storage component 340, output component 360, communication interface 370, and/or the like) may transmit the first temporary key to cause a first action to be performed based upon receipt of the first temporary key, as described above in connection with FIGS. 1A-1E.

As further shown in FIG. 6, process 600 may include discarding the first temporary key (block 650). In some implementations, an attestation engine (e.g., attestation engine 220, using processor 320, memory 330, storage component 340, and/or the like) may discard the first temporary key, as described above in connection with FIGS. 1A-1E.

As further shown in FIG. 6, process 600 may include receiving a second request to access the attestation key stored in the secure element of the device (block 660). In some implementations, an attestation engine (e.g., attestation engine 220, using processor 320, memory 330, storage component 340, input component 350, communication interface 370, and/or the like) may receive a second request to access the attestation key stored in the secure element of the device, as described above in connection with FIGS. 1A-1E.

As further shown in FIG. 6, process 600 may include performing a second application attestation to verify the identity of the application based on receiving the second request (block 670). In some implementations, an attestation engine (e.g., attestation engine 220, using processor 320, memory 330, storage component 340, communication interface 370, and/or the like) may perform a second application attestation to verify the identity of the application based on receiving the second request, as described above in connection with FIGS. 1A-1E.

As further shown in FIG. 6, process 600 may include generating a second temporary key based on a result of performing the application attestation (block 680). In some implementations, an attestation engine (e.g., attestation engine 220, using processor 320, memory 330, storage component 340, communication interface 370, and/or the like) may generate a second temporary key based on a result of performing the application attestation, as described above in connection with FIGS. 1A-1E. In some implementations, the second temporary key is different than the first temporary key.

As further shown in FIG. 6, process 600 may include transmitting the second temporary key to cause a second action to be performed based upon receipt of the second temporary key (block 690). In some implementations, an attestation engine (e.g., attestation engine 220, using processor 320, memory 330, storage component 340, output component 360, communication interface 370, and/or the like) may transmit the second temporary key to cause a second action to be performed based upon receipt of the second temporary key as described above in connection with FIGS. 1A-1E.

Process 600 may include additional implementations, such as any single implementation or any combination of implementations described below and/or described with regard to any other process described herein.

In some implementations, the first action or the second action of process 600 may include providing the application access to the attestation key. In some implementations, the first action or the second action of process 600 may include denying the application access to the attestation key. In some implementations, process 600 may include the first temporary key and the second temporary key, which may include symmetric keys by which access to the attestation key is selectively provided.

In some implementations, process 600 may include obtaining executable code, receiving a request to verify the executable code, obtaining an algorithm for verifying the executable code, executing the executable code based on the algorithm, and sending the executable code to the application for verification.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The application attestation devices and methods set forth herein may selectively condition access to attestation keys stored in secure element 230 based on verification of the satisfaction of attestation parameters and/or policies by attestation engine 220. In this way, illegitimate applications may be prevented from accessing the attestation data and, likewise, be prevented from accessing application server device 240, until satisfying the initial attestation performed by attestation engine 220. Attestation engine 220 may be stored in the TEE, independent from the rich-OS. In this way, an application may be attested, independent from the rich OS. In this way, spoofing attestation may become more difficult, by virtue of the application attestation being performed by the attestation engine residing in the TEE. In this way, the security associated with performing client device-server transactions by way of an application increases, and a service provider has further assurance that an application is legitimate and/or running in a trusted state, in advance of allowing the application access to the service provider's application server device. In this way, the application server device may attest to the identity of an application, despite a client device having been rooted or compromised.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be collected, stored, and employed in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that the devices, systems, and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories;
a rich operating system (OS); and
one or more processors, disposed in a trusted execution environment (TEE) of the device, communicatively coupled to the one or more memories,
the TEE being associated with a first bootloader and a first kernel,
the rich OS being associated with a second bootloader and a second kernel,
the first bootloader and the first kernel being separate from the second bootloader and the second kernel, respectively, and
wherein the one or more processors are to:
receive, from an application running on the device, a request to access an attestation key stored in a secure element of the device;
perform an application attestation to verify an identity of the application based on receiving the request to access the attestation key,
wherein, when performing the application attestation, the one or more processors are to:
obtain an attestation parameter, by which to verify the identity of the application; and
compare the attestation parameter and an application file attribute associated with the application to verify the identity of the application;
generate a temporary key based on the comparing; and
transmit, to the application, the temporary key to cause an action to be performed, by the application, upon receipt of the temporary key.

2. The device of claim 1, wherein the secure element comprises:
a universal integrated circuit card (UICC),
an embedded UICC, or
a subscriber identification module (SIM) card.

3. The device of claim 1, wherein the attestation parameter includes at least one of:
an electronic signature,
a hash value,
an algorithm for executing an executable code, or
metadata.

4. The device of claim 1, wherein the temporary key includes a symmetric key by which access to the attestation key is selectively provided.

5. The device of claim 1, wherein the action includes:
presenting the temporary key to the secure element; and
granting the application access to the attestation key.

6. The device of claim 1, wherein the action includes:
presenting the temporary key to the secure element; and
denying the application access to the attestation key.

7. The device of claim 1, wherein the one or more processors, are further to:
discard the temporary key upon transmitting the temporary key to the application.

8. The device of claim 1, wherein the temporary key includes a reusable key associated with a set of keys, and
wherein the one or more processors, when generating the temporary key, are to:
generate or select the temporary key based on being a next key, according to ascending or descending order, in the set of keys.

9. A method, comprising:
receiving, by a processor, and from an application running on a device, a request to access an attestation key stored in a secure element of the device,
the processor being disposed in a trusted execution environment (TEE) of the device,
the device including a rich operating system (OS),
the TEE being associated with a first bootloader and a first kernel,
the rich OS being associated with a second bootloader and a second kernel,
the first bootloader and the first kernel being separate from the second bootloader and the second kernel, respectively;
obtaining, by the processor, an attestation policy, by which to verify an identity of the application;
examining, by the processor, an application file associated with the application to determine whether the application file satisfies the attestation policy; and
selectively generating, by the processor, a temporary key based on a result of examining the application file,
wherein the temporary key is used to access the attestation key,
wherein the temporary key is generated based on the application file satisfying the attestation policy, and
wherein the temporary key is not generated based on the application file not satisfying the attestation policy.

10. The method of claim 9, wherein selectively generating the temporary key comprises generating the temporary key, and transmitting, to the application, the temporary key to cause an action to be performed upon receipt of the temporary key.

11. The method of claim 10, wherein the action includes granting the application access to the attestation key.

12. The method of claim 10, wherein the action includes denying the application access to the attestation key.

13. The method of claim 9, further comprising:
receiving, from the application, a subsequent request to access the attestation key stored in the secure element of the device;
performing a subsequent application attestation to verify the identity of the application based on receiving the subsequent request;
generating a new temporary key based on a new result of performing the subsequent application attestation; and
transmitting, to the application, the new temporary key to cause a subsequent action to be performed based upon receipt of the new temporary key.

14. The method of claim 9, further comprising:
receiving, from an application server device, a request to verify an executable code;
obtaining, from the application, the executable code based on receiving the request;
obtaining, from the secure element, an algorithm for executing the executable code;
executing the executable code using the algorithm; and
sending, to the application, the executable code for verification by the application server device.

15. The method of claim 9, further comprising:
receiving, from an application server device, a request for a device certificate by which to verify an identity of the device; and
transmitting, to the application server device, the device certificate for verifying the identity of the device.

16. A non-transitory computer-readable medium storing instructions, the instructions comprising:
one or more instructions that, when executed by one or more processors, disposed in a trusted execution environment (TEE), of a device,
the device comprising a rich operating system (OS),
the TEE being associated with a first bootloader and a first kernel, and
the rich OS being associated with a second bootloader and a second kernel,
the first bootloader and the first kernel being separate from the second bootloader and the second kernel, respectively,
cause the one or more processors to:
receive, from an application running on the device, a first request to access an attestation key stored in a secure element of the device;
perform a first application attestation to verify an identity of the application based on receiving the first request,
wherein, when performing the first application attestation, the one or more instructions that, when executed by the one or more processors of the device, cause the one or more processors to:
obtain an attestation parameter, by which to verify the identity of the application; and
compare the attestation parameter and an application file attribute associated with the application to verify the identity of the application;
generate a first temporary key based on a result of comparing the attestation parameter and the application file attribute;
transmit, to the application, the first temporary key to cause a first action to be performed based upon receipt of the first temporary key;
discard the first temporary key;
receive, from the application, a second request to access the attestation key stored in the secure element of the device;
perform a second application attestation to verify the identity of the application based on receiving the second request;
generate a second temporary key based on a result of performing the second application attestation,
wherein the second temporary key is different than the first temporary key; and
transmit, to the application, the second temporary key to cause a second action to be performed based upon receipt of the second temporary key.

17. The non-transitory computer-readable medium of claim 16, wherein the first action or the second action includes providing the application access to the attestation key.

18. The non-transitory computer-readable medium of claim 16, wherein the first action or the second action includes denying the application access to the attestation key.

19. The non-transitory computer-readable medium of claim 16, wherein the first temporary key and the second temporary key include symmetric keys by which access to the attestation key is selectively provided.

20. The non-transitory computer-readable medium of claim 16, wherein the one or more instructions, that when executed by the one or more processors, further cause the one or more processors to:
obtain executable code;
receive a request to verify the executable code;
obtain an algorithm for verifying the executable code;
execute the executable code based on the algorithm; and
send the executable code to the application for verification.

* * * * *